Jan. 20, 1959 R. E. WILLIAMS 2,869,714
CONVEYOR CONSTRUCTION
Original Filed Jan. 23, 1956 2 Sheets-Sheet 1

Inventor
Ralph E. Williams
by Parker & Carter
Attorneys

Jan. 20, 1959 R. E. WILLIAMS 2,869,714
CONVEYOR CONSTRUCTION
Original Filed Jan. 23, 1956 2 Sheets-Sheet 2

Inventor
Ralph E. Williams
by Parker & Carter
Attorneys

United States Patent Office 2,869,714
Patented Jan. 20, 1959

2,869,714
CONVEYOR CONSTRUCTION

Ralph E. Williams, River Forest, Ill., assignor to B. F. Gump Co., Cicero, Ill., a corporation of Illinois Original application January 23, 1956, Serial No. 560,786. Divided and this application November 29, 1956, Serial No. 625,058

1 Claim. (Cl. 198—213)

This invention relates to a movement in conveying mechanisms and in particular to an improved conveyor construction.

One purpose of the present invention is the provision of a conveyor construction that is easily assembled and which may be conveniently formed in any desired length.

Other purposes will appear from time to time in the course of the ensuing specification and claim.

I illustrate my invention more or less diagrammatically in the accompanying drawings wherein.

Like parts are indicated by like symbols throughout the specification and drawings.

Figure 1:
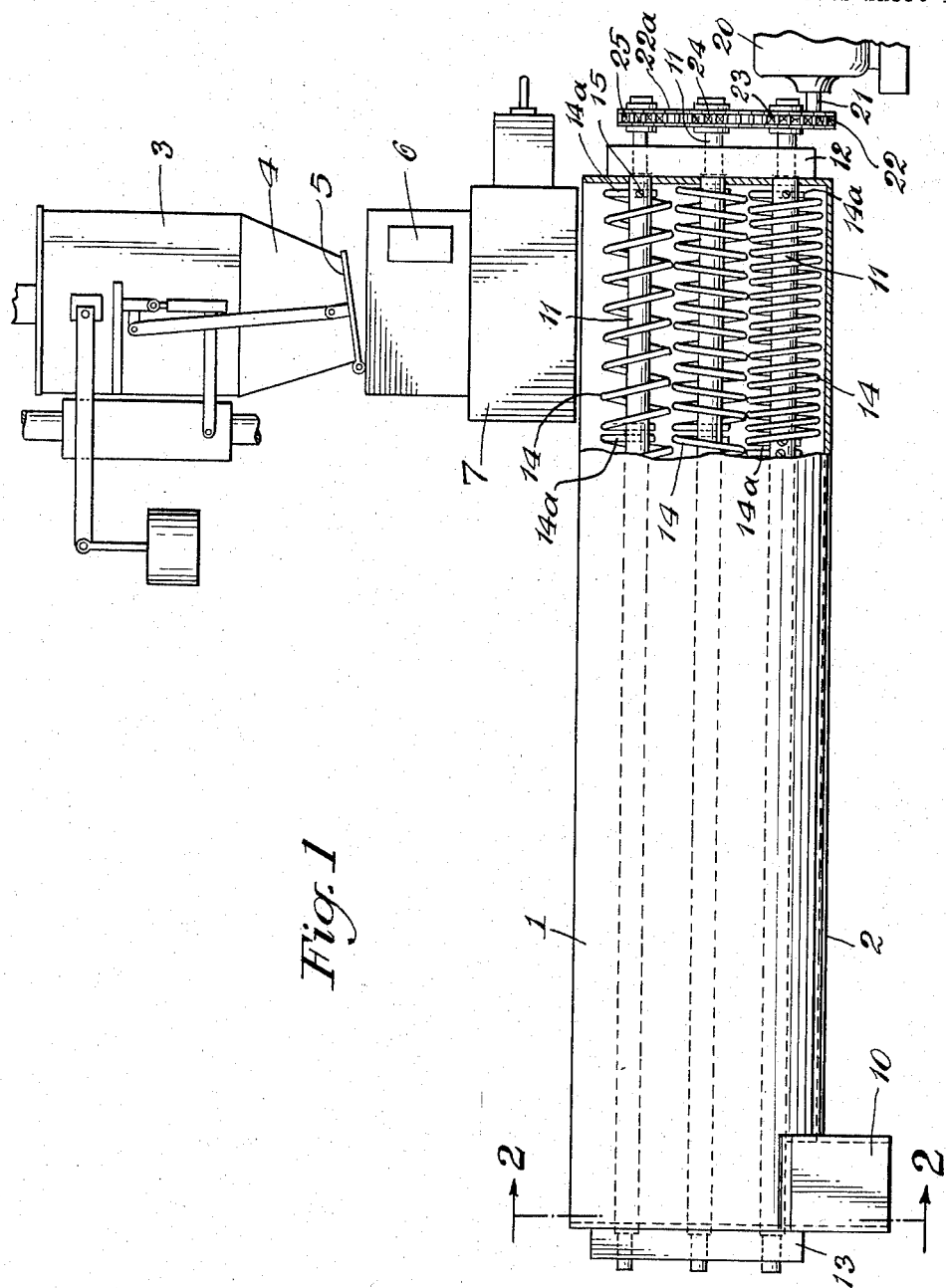
Figure 1 is an assembly view of a continuous feeding mechanism employing the conveying construction constituting the present invention.
Figure 2:
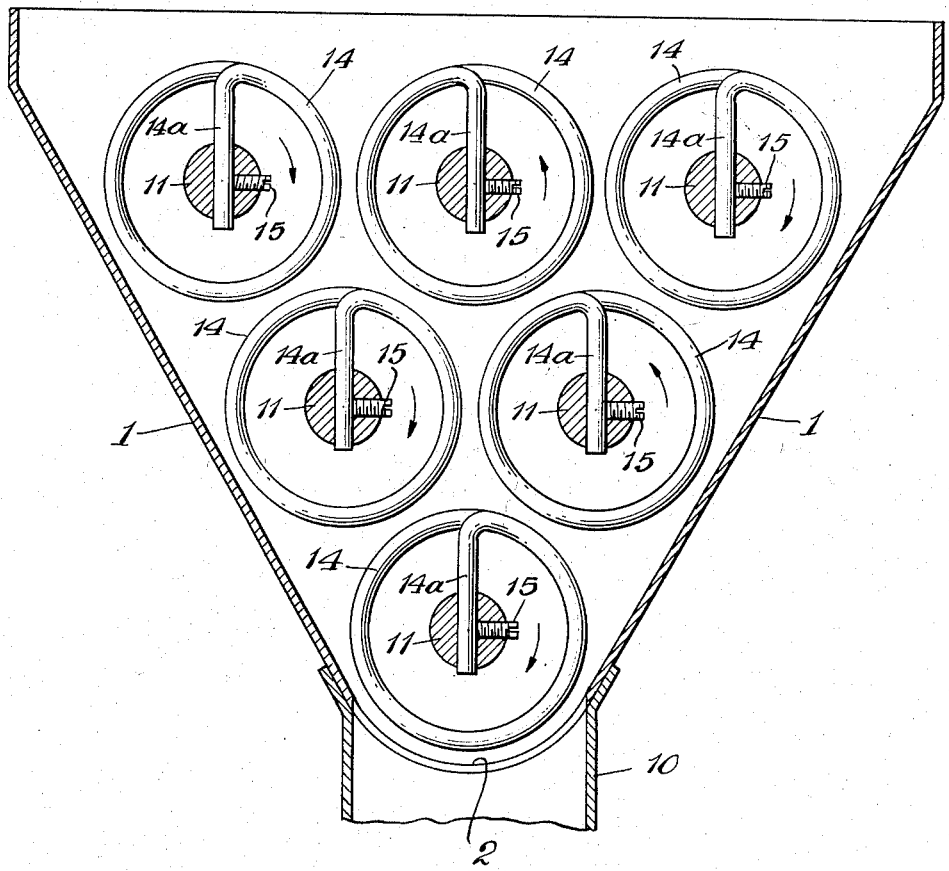
Figure 2 is a section, on an enlarged scale on the line 2—2 of Figure 1.

Referring to the drawings, and, particularly Figure 1, I illustrate a hopper or conveyor housing, or trough, shown as having downwardly converging side walls 1 connected at their lower, inner edges by a generally arcuate bottom 2. 3 indicates any suitable weighing hopper, the details of which do not, of themselves, form part of the present invention. The hopper includes a bottom portion or funnel 4 and a suitable discharge gate 5. 6 diagrammatically indicates any suitable timer for the weighing hopper 3. 7 is any suitable delivery section or portion for the conveyor housing 1. It will be understood that weighed charges from the hopper 3 may be periodically or irregularly delivered through the inlet portion 7 to the interior of one end of the feed trough or housing 1, 1. 10 is any suitable discharge outlet or spout located at the opposite end of the feed trough or housing.

Figure 3:
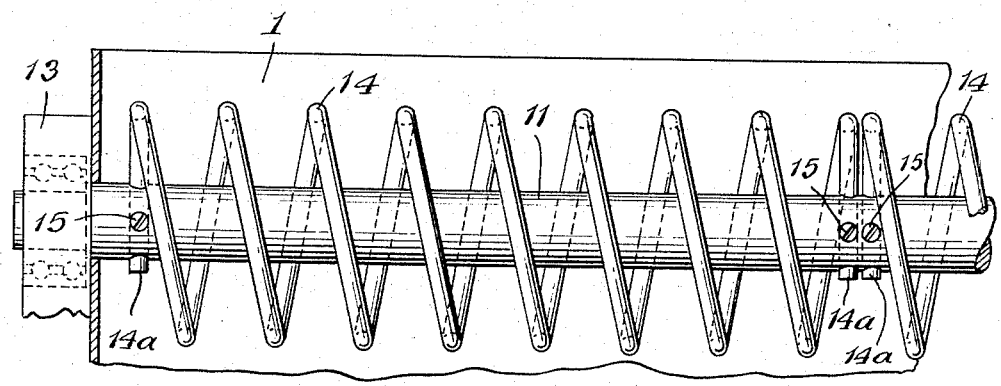
Figure 3 is an enlarged detailed view of the conveying elements utilized in the invention.

Mounted in the feed trough or housing, I illustrate a plurality of conveyor elements, each of which is shown as including a shaft 11 mounted at its opposite ends in any suitable bearings 12, 13, the bearings being located at the opposite ends of the trough or housing 1, 1. In the embodiment shown, each shaft 11 has a coil or helix thereabout which may, for example, be of wire or rod stock bent to the proper pitch. With reference to Figures 1 and 3, I illustrate a plurality of coil elements 14, each of which has generally radial end portions 14a which are shown as received in radial or diametric apertures in the shaft 11. Any suitable set screws 15, or their equivalent, may be employed to hold the members 14a in the proper relationship to the apertures through which they pass. In lieu of the arrangement shown, the coils may be welded or otherwise secured to the shafts. Adjacent radial end portions of the adjacent coils are disposed generally parallel to one another.

The housing hopper, discharge gate, and trough 1, 1 should be taken as typical of an installation in which the improved conveyor elements are used. They may be used in other forms of conveying mechanisms.

The coils may be rotated by any suitable means, in directions and at speeds appropriate to their angle of pitch and to their direction. I illustrate, in Figure 1, an example of a practical driving mechanism. 20 indicates any suitable motor, the details of which do not form part of the present invention. It is shown as having a shaft 21 carrying a sprocket 22 about which passes the endless chain 22a. This chain passes about a sequence of sprockets, one mounted on or in driving relation to each of the shafts 11. In the particular arrangement herein shown, and with relation to the parts as indicated in Figure 1, the lowest of the shafts 11 carries a sprocket 23 which is driven in a clockwise direction by the chain 22a. The upper shafts 11 may carry sprockets 24 and 25 which are driven by the chain 22a. It will be understood, of course, that this driving arrangement, while practical and advantageous, is given as an example rather than as a limitation. It will be noted, however, that, taking the group of shafts 11 as a whole, they are driven at a uniform rotational rate, but in different rotational directions. In the intermediate level, and in the highest level, each shaft, and thus each conveying coil, is driven in a rotational direction opposite to that of the adjacent coil or coils as shown in my copending application Serial No. 560,786, filed January 23, 1956.

This application is a divisional application of my copending application Serial No. 560,786, filed January 23, 1956.

Whereas, I have shown and described an operative form of my invention, I wish it to be understood that the showing and the description thereof should be taken in an illustrative or diagrammatic sense only and not in any limiting sense.

There are many modifications of the invention which will fall within the scope and spirit thereof and which will be apparent to those skilled in the art. The scope of the invention should be limited only by the scope of the hereinafter appended claims.

The use and operation of my invention are as follows:

I illustrate a conveyor construction which advantageously uses coiled rods as the helical conveying elements of the structure. These rods or bars are formed in coils and an elongated conveying element is formed by utilizing a plurality of such coiled rods positioned next to another along the length of the supporting shaft. The radial end portions of adjacent coils are positioned parallel to one another. The effect is that of a continuous conveyor formed of the several coiled section rods. The conveying elements may have any desired pitch and direction of rotation desired.

An advantageous feature of the adjacent radial end portions of adjacent coil sections resides in a leveling effect. The adjacent ends act as a "paddle" and tend to break up and disperse any high points in a stream of material handled by the conveyor.

I claim:

A conveying coil assembly adapted to impart a generally linear motion to granular and other discrete particles along a generally horizontal predetermined path including a generally horizontal shaft, means for rotating the shaft, and a spiral coil structure concentrically surrounding the shaft, the spiral coil structure including a plurality of coil sections of limited axial length and equal diameter, each such section being secured to the shaft only at its ends by radial end portions secured to the shaft and generally perpendicular thereto whereby a continuous spiral is provided, the radial end portions of adjacent coil sections being themselves adjacent and generally parallel to thereby form a minimum radial obstruction to the movement of material along the shaft, the pitch of the coils being so selected as to form a plurality of closely spaced unbroken spirals adapted to impart a positive translatory impetus to the material along the predetermined path.

References Cited in the file of this patent

UNITED STATES PATENTS

| | | |
|---|---|---|
| 652,677 | Kellington et al. | June 26, 1900 |
| 1,702,554 | Walker | Feb. 19, 1929 |